United States Patent [19]

Uemura et al.

[11] 4,266,790
[45] May 12, 1981

[54] VEHICLE HEIGHT ADJUSTING APPARATUS

[75] Inventors: Tamio Uemura; Yoshiki Kodama, both of Kawasaki, Japan

[73] Assignee: Tokico Ltd., Kanagawa, Japan

[21] Appl. No.: 27,014

[22] Filed: Apr. 3, 1979

[30] Foreign Application Priority Data

Apr. 20, 1978 [JP] Japan .................. 53-46822

[51] Int. Cl.³ .......................................... B60G 21/06
[52] U.S. Cl. ..................................... 280/6.1; 280/714
[58] Field of Search ............... 280/709, 714, 703, 702, 280/6.1, 6 R; 105/164

[56] References Cited

U.S. PATENT DOCUMENTS

| 3,124,368 | 3/1964 | Corley et al. | 280/6 R |
| 3,183,015 | 5/1965 | Allinquant | 280/6.1 |
| 3,262,711 | 7/1966 | Behles | 280/6.1 |
| 3,277,840 | 10/1966 | Yao-Tzu-Li | 280/6.1 U X |
| 3,477,733 | 11/1969 | Gottschalk | 280/6 R |
| 3,881,736 | 5/1975 | Wilfert | 280/6.1 |
| 3,970,009 | 7/1976 | Schultz | 280/6.1 X |
| 4,030,777 | 6/1977 | Rabenseifner | 280/714 |
| 4,084,830 | 4/1978 | Daniel, Jr. et al. | 280/6.1 |

Primary Examiner—John J. Love
Assistant Examiner—Norman L. Stack, Jr.
Attorney, Agent, or Firm—Wenderoth, Lind & Ponack

[57] ABSTRACT

A vehicle height adjusting apparatus in which a sensor means detects the distance between the body and axles of a vehicle while the vehicle is parked or moving. A signal comparator divides the vehicle height detection range into a plurality of detection zones based on the sensor signals; a pulse converter circuit converts the signals into pulse signals of the detection zones; an integrator circuit integrates the pulse signals for a period of time; a determination circuit determines the vehicle height level and a fluid circuit controls the inflow and outflow of fluid into and out of a suspension device.

7 Claims, 6 Drawing Figures

| CONDITION | (1) | (2) | (3) | (4) |
|---|---|---|---|---|
| SENSOR | OFF | OFF | ON | ON |
| SENSOR | OFF | ON | ON | OFF |
| AIR INLET VALVE | CLOSED | CLOSED | OPEN | OPEN |
| AIR EXHAUST VALVE | OPEN | CLOSED | CLOSED | CLOSED |
| VEHICLE HEIGHT | H | M | L | L |

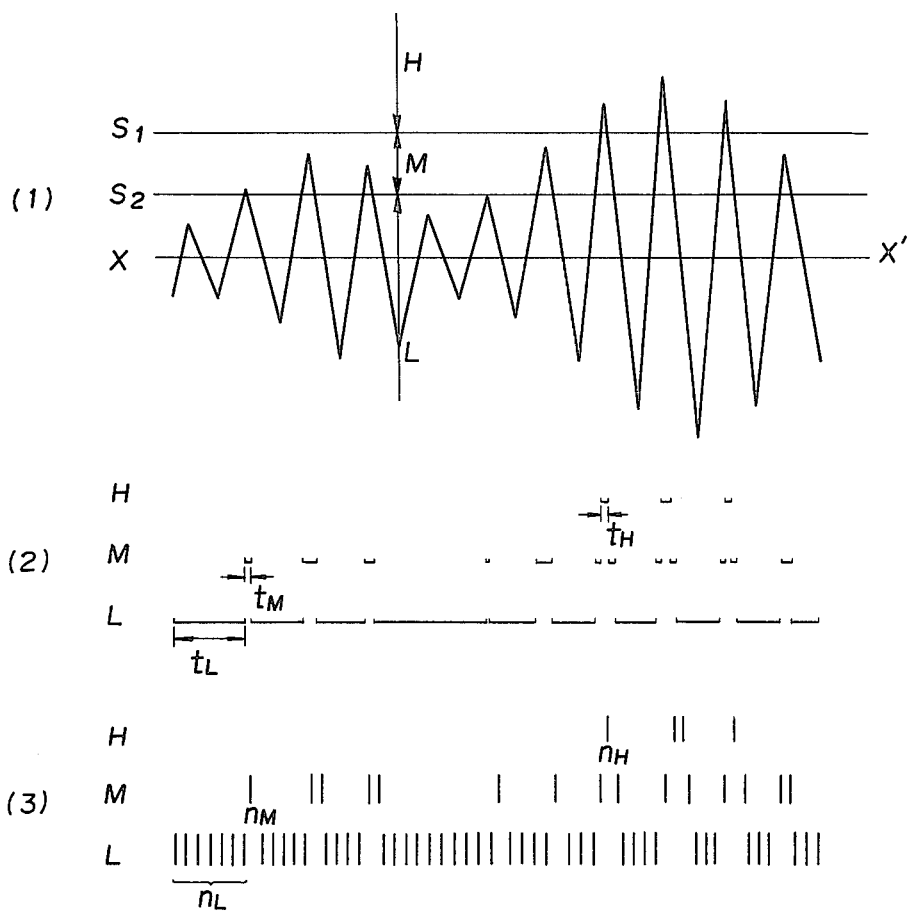

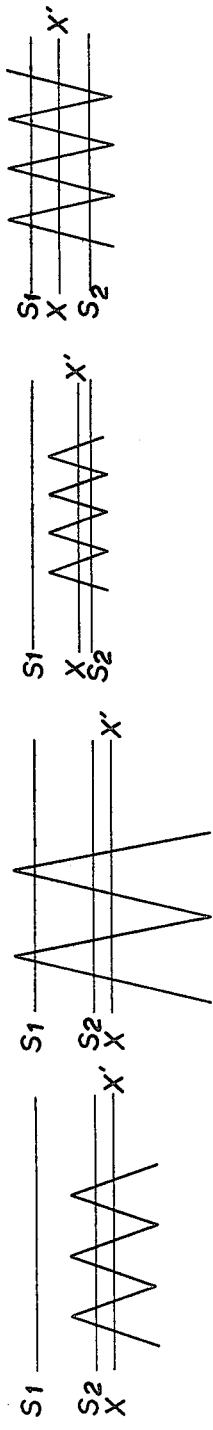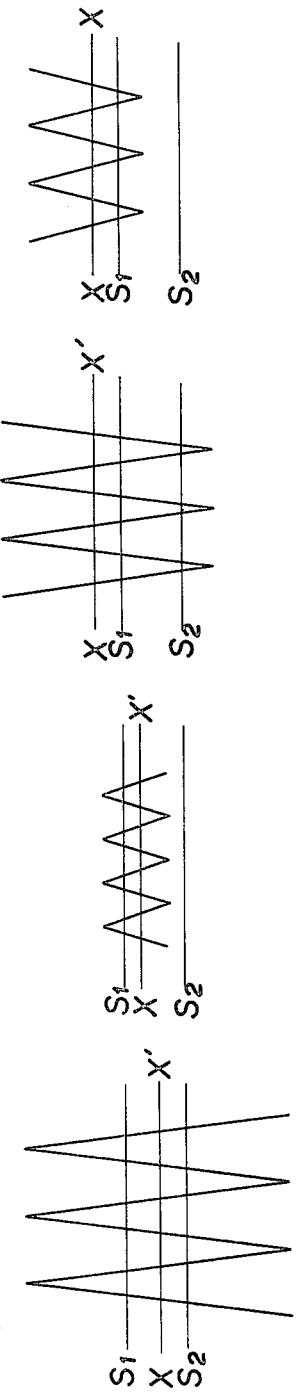
FIG. 6

VEHICLE HEIGHT ADJUSTING APPARATUS

BACKGROUND OF THE INVENTION

This invention relates to a vehicle height adjusting apparatus.

In the conventional vehicle height adjusting apparatus, there have been provided mechanical, electric, electromagnetic or electronic sensors which are displaceable relative to the distance between the vehicle chassis (the part above the springs) and the axles (the parts below the springs) so as to detect the vehicle height, and a vehicle height adjustment is effected in response to such signals while the vehicle is parked or moving.

When the vehicle height adjustment range is divided into high, intermediate or reference and low vehicle height zones, each of the prior art vehicle height adjusting apparatus is adapted to produce a vehicle height adjusting signal only when the chassis vibrates within any one of the three vehicle height adjusting zones to thereby achieve a desired vehicle height. However, although such adjustment system does not present any problem when the vehicle height varies statically due to variations in load while the vehicle is parked, when the vehicle height varies to substantially cover two or more vehicle height adjusting zones due to excessive vibration while the vehicle is moving, the vehicle adjusting apparatus fails to respond to such extreme variation in vehicle height.

SUMMARY OF THE INVENTION

Therefore, the present invention has as its object to provide a novel and improved vehicle height adjusting apparatus which can effectively eliminate the disadvantages inherent in the prior art vehicle adjusting apparatus for controlling vehicle height referred to hereinabove, and which always maintains an avarage or reference vehicle height level and maintains the vehicle in a reference condition substantially equal to that for a static vehicle height level even when the vehicle is moving.

The above and other objects and attendant advantages of the present invention will be more readily apparent to those skilled in the art from a reading of the following detailed description in conjunction with the accompanying drawings which show one preferred embodiment of the invention for illustration purposes only, but not for limiting the scope of the same in any way.

BRIEF DESCRIPTION OF THE DRAWINGS

FIG. 5 is a schematic diagram showing the manner in which signals from said sensors are processed as the height of a vehicle varies while the vehicle is moving; and FIG. 6 is a schematic diagram logically explaining the height levels of the vehicle while moving.

PREFERRED EMBODIMENT OF THE INVENTION

Figure 1:
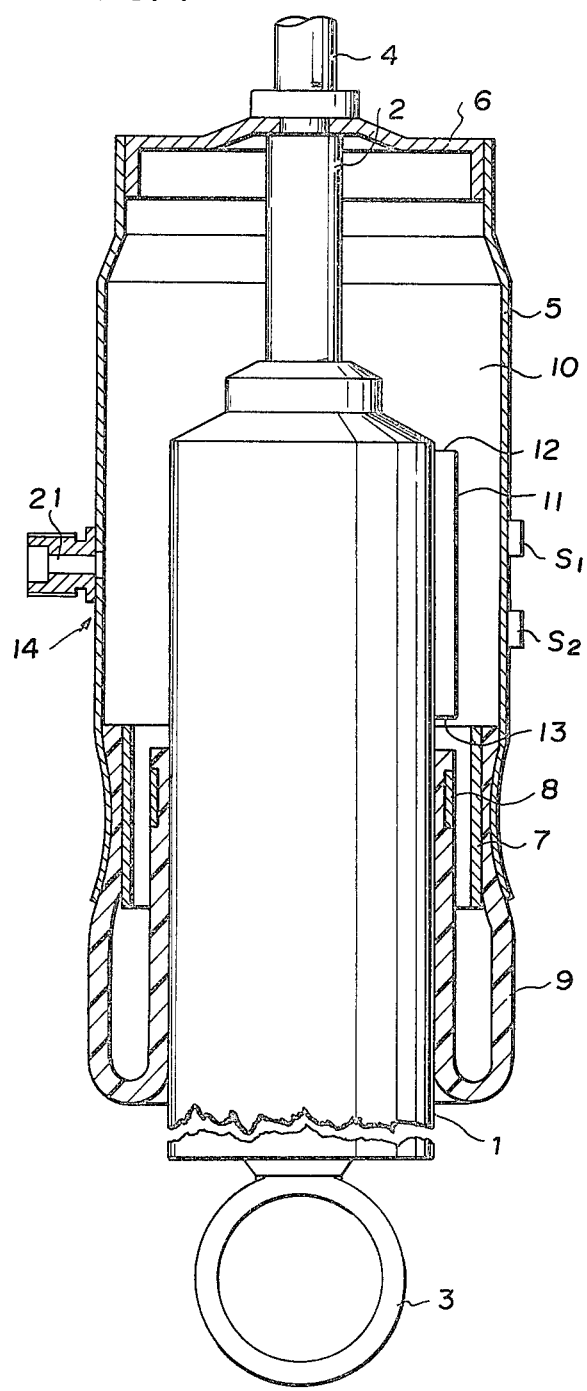
FIG. 1 is a vertical sectional view of the auxiliary vehicle height adjusting suspension device of the vehicle height adjusting apparatus of the present invention having vehicle height sensors mounted thereon.

The present invention will now be described referring to the accompanying drawings and more particularly, to FIG. 1 in which the auxiliary vehicle height adjusting suspension device of the vehicle height adjusting apparatus is generally designated by reference numeral 14. In FIG. 1, reference numeral 1 denotes the outer cylinder of a publicly known buffer and the outer cylinder has an attachment ring 3 provided at the lower end for connection with an axle of a vehicle (not shown) and a piston (not shown) and a piston rod 2 slidably received within the interior of the outer cylinder. A cap 6 is secured to the upper end of the piston rod 2 by means of a connection bar 4 or the like and sealably surrounds the piston rod. The upper end of the connection bar 4 is secured to the body of the vehicle (not shown) and a non-magnetic protection cylinder 5 is sealably connected the upper end about the cap 6 so as to be held in position by the cap. In FIG. 1, although the protection cylinder 5 is shown as surrounding a portion of both the buffer outer cylinder 1 and piston rod 2 in peripherally spaced relationship thereto, the cap 6 and protection cylinder 5 may be formed as a unitary unit without departing from the scope of the present invention.

Figure 2:
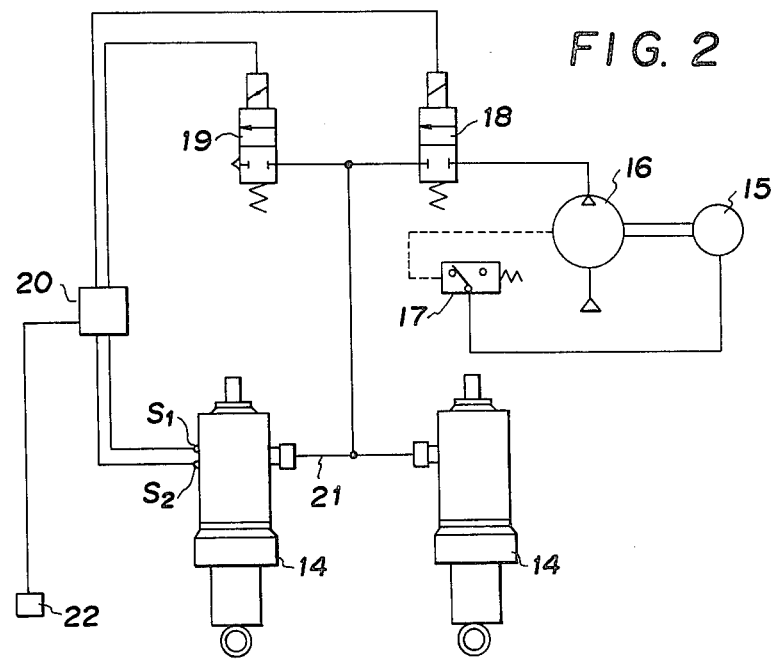
FIG. 2 is a schematic diagram of the system of the vehicle height adjusting apparatus according to the present invention.

One end portion of diaphragm 9 is sealably attached to the inner surface of the lower end portion of the protection cylinder 5 by means of a fastener 7 while the other end portion of the diaphragm is sealably attached to the outer surface of the lower portion of the buffer outer cylinder 1 by means of a fastener 8. The upper end portions of the buffer outer cylinder 1 and protection cylinder 5, the piston rod 2 and the cap 6 define an annular air chamber 10. A pipe 21 is provided in the upper end portion of the protection cylinder 5 on one side of the outer periphery thereof (the left-hand side as seen in FIG. 1) in communication with the air chamber 10 and connected through conduits to an air inlet valve 18 and an air exhaust valve 19 (see FIG. 2) whereby the air pressure within the air chamber 10 is controlled. Thus, the suspension device 14 supports a portion or the whole of the weight of the vehicular body by means of the pressure of compressed air introduced into the air chamber 10.

A magnet 11 is mounted by a known mounting mean on the side of the outer periphery of the buffer outer cylinder 1 opposite the side on which the pipe 21 is provided (the right-hand side as seen in FIG. 1) which is a position above the diaphragm 9 in parallel with the axis of the cylinder 1 and two vertically spaced reed switch type magnetic sensors $S_1$ and $S_2$ (the sensors will be referred to as "sensors $S_1$ and $S_2$" hereinafter) are mounted on the outer periphery of the protection cylinder 5 in opposed relationship to the magnet 11. The sensors $S_1$ and $S_2$ and magnet 11 may be mounted on the inner peripheries of the protection cylinder 5 and of the buffer cylinder 1, respectively, if desired, within the scope of the present invention. When the sensors $S_1$ and $S_2$ are mounted on the inner periphery of the protection cylinder 5, the protection cylinder 5 need not necessarily be made of a non-magnetic material. The magnet 11 and sensors $S_1$, $S_2$ form a sensor assembly which detects the distance between the undersurface of the vehicular body and axles, that is, the vehicle height. The maximum stroke and amplitude of the buffer, the vertical dimensions of the magnet 11 and sensors $S_1$ and $S_2$ and the distance between the sensors $S_1$ and $S_2$ are so selected that when the vehicle height is at a predetermined minimum level, the lower end face 13 of the magnet 11 is positioned between the sensors $S_1$ and $S_2$ to react with only the upper sensor $S_1$; when the vehicle height is at a predetermined maximum level, the upper end face 12 of the magnet 11 is positioned below the lower sensor $S_2$; and when the vehicle height is at a predetermined reference of intermediate level, the upper end face 12 of the magnet 11 is positioned at a position between the upper and lower sensors $S_1$ and $S_2$ to react with only the lower sensor $S_2$. Thus, the sensors $S_1$ and $S_2$ are spaced from each other a distance which corresponds to a prescribed permitted tolerance of preciseness set for the vehicle height.

The sensors $S_1$ and $S_2$ are connected through a control circuit 20 to an electromagnetic air exhaust valve 19 and an electromagnetic air inlet valve 18, respectively and the electromagnetic air inlet valve 18 is in turn connected to an air compressor 16. In FIG. 1, reference numeral 15 denotes a drive source for driving the air compressor 16 and the drive source may be an engine or motor. Reference numeral 17 denotes a pressure switch which automatically controls the energization and deenergization of the air compressor 16.

Provided in the control circuit 20 is a parking sensor 22 which discriminates between when the vehicle is parked and when it is moving and produces an ON signal when the vehicle is parked and an OFF signal when the vehicle is moving.

Figure 3:
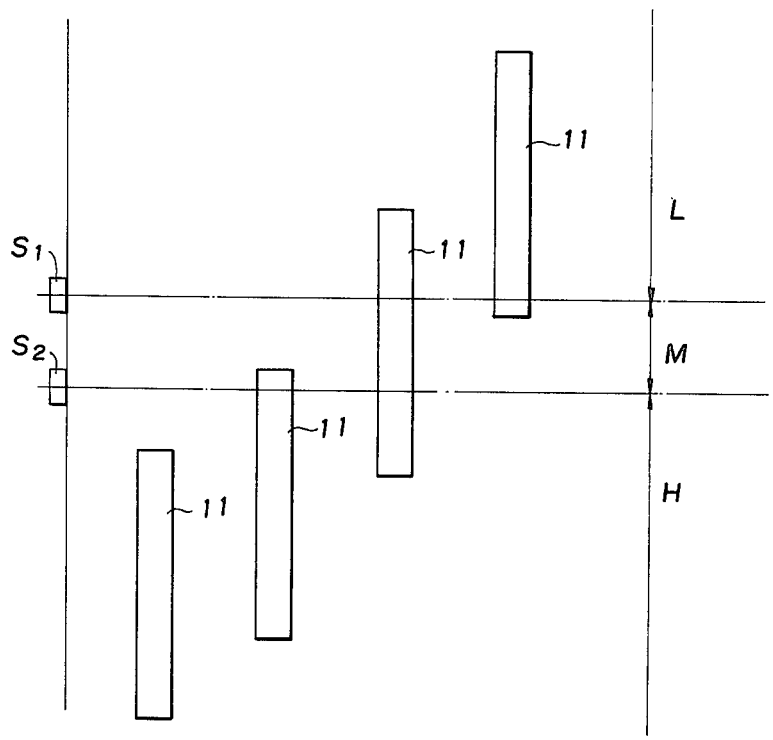
FIG. 3 is a schematic diagram showing the vehicle height detection by said sensors, the operation of the air inlet and exhaust valves and the static vehicle height control as the height of a vehicle varies.

With the above-described construction and arrangement of the components of the vehicle height adjusting apparatus of the invention, the apparatus operates as follows:

The vehicle height adjusting apparatus is designed to detect vehicle height levels by the relative displacement between the sensors $S_1$ and $S_2$ and magnet 11 regardless of whether the vehicle is parked or moving. As shown in FIG. 3, if the entire magnet 11 is positioned below the lower sensor $S_2$ and both the sensors $S_1$ and $S_2$ are in the OFF position (the condition(1) in FIG. 3), then the condition is referred to as the "high vehicle height zone H". If the upper end face 12 of the magnet 11 is positioned between the upper and lower sensors $S_1$ and $S_2$ and the upper sensor $S_1$ is in the OFF position while the lower sensor $S_2$ is in the ON position (the condition (2) in FIG. 3), then the condition is referred to as the "reference or intermediate vehicle height zone M". If the magnet 11 is positioned as shown in FIG. 1, for example and both the upper and lower sensors $S_1$ and $S_2$ are in the ON position (the condition (3) in FIG. 3), then the condition is referred to as the "low vehicle height zone L".

The vehicle height control operation will be first described in connection with the situation when the vehicle is parked.

Figure 4:
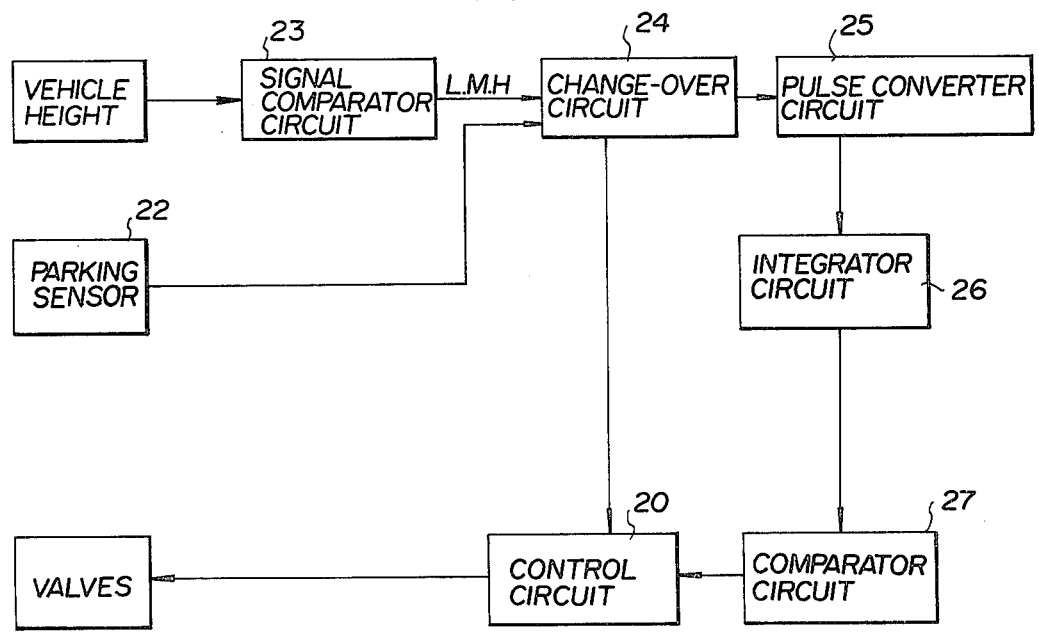
FIG. 4 is a schematic diagram of the control system of the vehicle height adjusting apparatus.

When the vehicle is parked, a portion of the circuit as shown in FIG. 4 is employed. That is, signals provided by the sensors $S_1$ and $S_2$ are fed into a signal comparator circuit 23 where the signals are classified into L, M and H zone signals, respectively.

When the vehicle is parked, since a signal from the parking sensor 22 which is produced in response to a parking brake switch becomes an ON signal, a changeover circuit directly inputs signals outputted from the signal comparator circuit 23 to the control circuit 20.

A signal from the control circuit 20 changes over the operation between the valves 18 and 19 to thereby effect vehicle height control. The vehicle height control when the vehicle is parked will be now described in detail referring to FIG. 3. When the vehicle height is at a predetermined maximum height level with substantially no load carried on the vehicle, the upper end face 12 is positioned below the lower sensor $S_2$, that is, within the high vehicle height zone H in which the sensor $S_1$ is in the OFF position and the sensor $S_2$ is in the OFF position. When the signal representing this condition enters the control circuit 20, the electromagnetic air inlet valve 18 is closed and the electromagnetic air exhaust valve 19 is opened whereby air under pressure is discharged from the air chamber 10 through the pipe 21 resulting in the reduction of the vehicle height.

When the upper end face 12 of the magnet 11 reaches the position where the lower sensor $S_2$ responds to the magnet 11 or the condition (2) in FIG. 3 (the reference vehicle height zone M), the upper sensor $S_1$ remains off and the lower sensor $S_2$ turns on. At this time, both the air inlet valve 18 and air exhaust valve 19 are closed to thereby terminate the displacement movement of the magnet 11. Thus, no vehicle height adjustment is effected.

When the vehicle height is slightly lower than a predetermined or set level and the upper end face 12 of the magnet 11 enters the vehicle height zone L, both the sensors $S_1$ and $S_2$ turn on whereby the control circuit 20 opens the air inlet valve 18 and closes the air exhaust valve 19 and air under pressure is introduced by the air compressor 16 into the air chamber 10. As a result, vehicle height adjustment is effected so as to raise the vehicle body. Such vehicle height adjusting operation continues until the upper end face 12 of the magnet 11 reaches an intermediate position between the upper and lower sensors $S_1$ and $S_2$ (the condition (2) in FIG. 3 or reference vehicle height zone M), the upper sensor $S_1$ is deenergized and the air inlet valve 18 is closed.

The operation of the air compressor 16 terminates as the internal pressure of the compressor increases to a predetermined value (a value higher than a predetermined maximum value of the internal pressure of the air chamber 10) and the drive source 15 is then deenergized by the pressure switch 17.

While the vehicle is parked, if the vehicle height adjusting apparatus is not required to have a precise response function, the parking sensor 22 may be eliminated. In such a case, signals from the sensors $S_1$ and $S_2$ are operated through the circuit as shown in FIG. 4 and thereafter, a signal from the control circuit 20 operates the apparatus so as to position the vehicle height in the intermediate or reference vehicle height zone M.

The vehicle height control when the vehicle is moving will be now described.

While the vehicle is moving, since a signal from the parking sensor 22 which responds to the parking brake switch or the like becomes an OFF signal, the changeover circuit 24 is shifted so as to input a signal outputted from the signal comparator circuit 23 to a pulse converter circuit 25.

Thus, while the vehicle is moving, vehicle height control is effected based on the circuit shown in FIG. 4. The vehicle height control while the vehicle is running will now be described in detail.

During a given time period while the vehicle is running, when the intermediate or reference line X—X' is positioned below the lower sensor S$_2$ as shown in FIG. 5 (1) and the buffer vibrates upwardly and downwardly with respect to the reference line X—X', signals of the vibratory movement are inputted to the signal comparator circuit 23 which classifies the input signals into a high vehicle height position (the vehicle height zone H) signal, a reference vehicle height position (the vehicle height zone M) signal and a low vehicle height position (the vehicle height zone L) signal and these signals are outputted from the comparator circuit 23. These signals are shown as tH, tM and tL, respectively, in FIG. 5 (2). In order to digitally process these signals further, when these signals are converted into equally spaced pulse signals in a pulse converter circuit 25 upon the receipt of pulses from an oscillator circuit (not shown) thereto, these signals become nH, nM and nL pulse signals as shown in FIG. 5 (3). The three converted pulse signals are integrated in an integrator circuit 26 in a predetermined periodic time interval. The time interval is set by a clock circuit (not shown) and should be short enough so that the height adjusting mechanism is not actuated when the vehicle runs over small pebbles. The time interval is preferably set within the range of several seconds to several tens of seconds depending upon the response time of the vehicle height adjusting apparatus.

Assuming that the numbers of pulses integrated in the integrator circuit 26 as shown in FIG. 4 are NH, NM and NL, respectively, when these values are compared with each other in the comparator circuit 27, the control circuit 20 operates the valve arrangement based on the comparison result until the reference vehicle height zone M for the vehicle is achieved.

When this vehicle height zone M has been achieved, the control circuit 20 maintains the adjusted vehicle height until succeeding signals are produced from the comparator circuit 27.

In other words, assuming that the buffer vibrates with a constant amplitude, when typical combinations of NH, NM and NL of the integrated pulse signal values are considered, the pulse signal values can be combined so as to have the eight different relationships as shown in FIG. 6.

As to the eight combinations, when NH, NM and NL have the relationships as (1) and (2) in FIG. 6, it is determined that the average vehicle height is in the vehicle height zone L, when NH, NM and NL have the relationships as (3)-(6) in FIG. 6, it is determined that the average vehicle height is in the vehicle height zone M and when NH, NM and NL have the relationships as (7) and (8) in FIG. 6, it is determined that the average vehicle height is in the vehicle height zone H. Thus, by comparing the various relationships between the integrated pulse signals NL, NM and NH from the above-mentioned integrator circuit 26 in the comparator circuit 27, the vehicle height during each time band is determined depending upon when the vehicle height is in either one of the vehicle height zones L, M or H.

The result is fed to the control circuit 20 as a command and vehicle height control is effected in accordance with the command in the same manner as the static vehicle height control.

The above-mentioned eight different relationships between the integrated pulse signal values NH, NM and NL are only representative ones and the present invention is not limited to such relationships only.

In the illustrated embodiment, although it is contemplated that the sensors S$_1$ and S$_2$ control the vehicle height to any one of the vehicle height zones L, M and H, the present invention is not limited to such a control arrangement and if the vehicle height positions are capable of being integrated within a given time period and the integrated values are capable of being compared with each other, a greater number of vehicle height positions can be provided within the scope of the present invention.

And in the illustrated embodiment, although the magnet 11 and magnetic sensors S$_1$ and S$_2$ are employed as sensing means, the present invention is not limited to the use of such sensing means and other sensors such as electric, electronic and mechanical sensors can be employed within the scope of the present invention provided that such sensors can detect any variation in the distance or vehicle height between the vehicle body and axles.

Furthermore, in the illustrated embodiment, although the sensors are shown as being incorporated into the auxiliary vehicle height adjusting suspension device, the sensors are not necessarily incorporated into the device.

With the above-described construction, arrangement and operation of the components of the vehicle height adjusting apparatus of the invention, the present invention can effectively eliminate the disadvantages inherent in similar prior art apparatus.

By the provision of a vehicle with the vehicle height adjusting apparatus of the present invention, even when the vehicle starts as soon as a load has been placed thereon and/or runs on a very rough road or even when the vehicle runs under adverse conditions, the vehicle height can be automatically controlled while the vehicle is running until the vehicle height enters the reference vehicle height zone and the vehicle body is maintained in the stabilized position while running to thereby assure a comfortable drive.

And according to the present invention, the vehicle height can be rapidly controlled in response to any variation in the weight of the loaded vehicle as the vehicle is unloaded or additionally loaded or the occupant or occupants get in and out of the vehicle while the vehicle is parked. In addition, the vehicle adjusting apparatus of the present invention does not cause any variation in the vehicle height due to rough road conditions and does not respond to any momentary static variation in vehicle height as the result of the driver's steering of the vehicle, but functions to compensate for any variation in static load to thereby automatically position the vehicle body in the reference vehicle height zone. And even when the vehicle starts as soon as the vehicle has been loaded and/or an occupant or occupants are riding in the vehicle and it is moving on a rough road under adverse conditions, the vehicle height can be controlled to the reference vehicle height position. Furthermore, since the vehicle height control is effected based on a digital control logic, an integrator circuit such as a micro-processor can be utilized and thus, a less expensive vehicle height adjusting apparatus can be provided.

And in the illustrated embodiment, since the chassis and axles above and below the springs of the vehicle are a non-contact system, the sensors are free from deviation in preciseness of detection due to wear and have a long service life. And since all parts of the sensors are positioned within the buffer, protective means for preventing water, earth, sand and pebbles from reaching the sensors are not required, thereby making it possible to minimize the dimensions of the adjusting apparatus. Even when the sensors are mounted on the outer surface of the protective cylinder, a small protection plate with a packing functions as sufficient protective means for the sensors. When the sensors are mounted on the outer periphery of the protective cylinder, there is no part which extends through the air chamber in which a high pressure is maintained to thereby simplify the construction of the vehicle adjusting apparatus. Lastly, since the sensors employed are magnetic sensors, the sensors are not subject to a reduction of detection preciseness.

While there is shown and described only one preferred embodiment of the invention by way of illustration, it is to be understood that it is not limited or confined to the precise details of construction herein described and delineated, and modification and variation may be made within the scope of the appended claims without departing from the spirit of the invention.

What is claimed is:

1. A vehicle height adjusting apparatus for a vehicle, comprising:
    sensor means for detecting a vehicle height level by measuring the distance between the body and axles of said vehicle and for providing an output signal corresponding to said measured height level;
    a signal comparator circuit for receiving and comparing said output signal from said sensor means and for classifying said output signal into one of a plurality of vehicle reference height zones;
    a pulse converter circuit for converting said classified signal into a pulse signal corresponding to one of said height zones;
    an integrator circuit for integrating said pulse signal for each respective zone during a given time period;
    a determination circuit for receiving said integrating signal for each zone from said integrator circuit and for comparating the number of pulses for each zone and provide an output signal indicative of said vehicle height level;
    and a fluid circuit for controlling the inflow and outflow of fluid into and out of a suspension device in dependance upon said output signal from said determination circuit, whereby said vehicle height level is adjusted to be in a predetermined vehicle reference height zone.

2. The vehicle height adjusting apparatus as set forth in claim 1, wherein each of said given time periods of said integrator circuit is within the range of several seconds to several tens of seconds.

3. The vehicle height adjusting apparatus as set forth in claim 2, further comprising a parking sensor for discriminating between the parked and moving states of said vehicle, said sensor connected to said fluid circuit, wherein said fluid circuit is directly controlled by an output signal from said parking sensor when said vehicle is in its parked state.

4. The vehicle height adjusting apparatus as set forth in claim 2, wherein said sensor means is incorporated in said suspension device.

5. The vehicle height adjusting apparatus as set forth in claim 3, wherein said parking sensor means is incorporated in said suspension device.

6. The vehicle height adjusting apparatus as set forth in claims 1 or 2 or 3 or 4 or 5, wherein said plurality of vehicle reference height zones comprise a low vehicle height zone, a reference vehicle height zone, and a high vehicle height zone.

7. The vehicle height adjusting apparatus as set forth in claim 6, wherein said predetermined reference height zone is said vehicle reference height zone.

* * * * *